(12) United States Patent
Legros et al.

(10) Patent No.: US 10,132,369 B2
(45) Date of Patent: Nov. 20, 2018

(54) AUTOMATICALLY ACTUATED DISCONNECT COUPLINGS

(71) Applicant: Hamilton Sundstrand Corporation, Charlotte, NC (US)

(72) Inventors: Craig R. Legros, Rockford, IL (US); David S. Behling, Belvidere, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 112 days.

(21) Appl. No.: 15/418,387

(22) Filed: Jan. 27, 2017

(65) Prior Publication Data
US 2018/0216678 A1   Aug. 2, 2018

(51) Int. Cl.
| F16D 48/10 | (2006.01) |
| F16D 48/06 | (2006.01) |
| F16D 43/00 | (2006.01) |
| F16D 9/00 | (2006.01) |

(52) U.S. Cl.
CPC ............... *F16D 48/10* (2013.01); *F16D 9/00* (2013.01); *F16D 43/00* (2013.01); *F16D 48/064* (2013.01); *F16D 2500/304* (2013.01); *F16D 2500/3163* (2013.01); *F16D 2500/5102* (2013.01)

(58) Field of Classification Search
None
See application file for complete search history.

(56) References Cited

U.S. PATENT DOCUMENTS

| 4,651,855 | A | * | 3/1987 | Grunberg | B60W 30/18 192/103 C |
| 4,986,401 | A | * | 1/1991 | Petzold | B60W 10/02 477/176 |
| 2012/0109569 | A1 | | 5/2012 | Padinharu et al. | |
| 2016/0094172 | A1 | | 3/2016 | Oesterheld et al. | |
| 2016/0134171 | A1 | | 5/2016 | Davis et al. | |
| 2017/0363158 | A1 | * | 12/2017 | Goossens | F16D 11/10 |

FOREIGN PATENT DOCUMENTS

| CN | 201827630 U | 5/2011 |
| JP | 2008082967 A | 4/2008 |

* cited by examiner

*Primary Examiner* — Jacob S. Scott
*Assistant Examiner* — Timothy Hannon
(74) *Attorney, Agent, or Firm* — Locke Lord LLP; Daniel J. Fiorello; Scott D. Wofsy

(57) ABSTRACT

An automatic disconnect coupling includes a retainer and a biasing member. The biasing member is coupled to the retainer and is arranged to communicate excitation from a generator input member to the retainer. The retainer and the biasing member have a fundamental frequency tuned to the rotational speed of the generator input member to automatically disconnect the input member from a drive member when rotating unbalance of the input member exceeds a predetermined level.

17 Claims, 5 Drawing Sheets

AUTOMATICALLY ACTUATED DISCONNECT COUPLINGS

BACKGROUND OF THE INVENTION

1. Field of the Invention

The present disclosure generally relates to couplings, and more particularly to disconnect couplings for generators such as in aircraft electrical systems.

2. Description of Related Art

Generators, such as in aircraft electrical systems, commonly include a rotor with permanent magnets and a stator having a main field winding. The rotor is generally supported for rotation relative to a stator by bearings and is connected to an engine for rotating the rotor rotates relative to the stator. As the rotor rotates relative to the stator a magnetic field generated by the permanent magnets induces electric current in the main field winding, which the electrical system provides to electrical devices connected to the electrical system.

Some generators include a disconnect mechanism arranged between the engine and the generator rotor which allows the generator rotor to be disconnected from the engine manually. Manual disconnection can be desirable when load on the electrical system is such that power from the generator is not required or when the generator requires maintenance. Manual disconnections generally entail remote actuation by an operator, which causes the disconnect mechanism to mechanically separate the generator rotor from the engine. For example, in aircraft electrical system, a generator disconnect switch may be located in the aircraft cockpit allowing a crew member to disconnect the generator when appropriate.

Such conventional methods and systems have generally been considered satisfactory for their intended purpose. However, there is still a need in the art for improved systems and methods for mechanically disconnecting generators from sources of generator rotation. The present disclosure provides a solution for this need.

SUMMARY OF THE INVENTION

An automatic disconnect coupling includes a retainer and a biasing member. The biasing member is coupled to the retainer and is arranged to communicate excitation from a generator input member to the retainer. The retainer and the biasing member have a fundamental frequency tuned to the rotational speed of the generator input member to automatically disconnect the input member from a drive member when rotating unbalance of the input member exceeds a predetermined level.

In certain embodiments, the coupling can include a solenoid. The solenoid can be operatively connected to the retainer. The solenoid can include a core and a coil. The retainer can be fixed relative to the core. The coil can extend about the core. A manual disconnected lead can be connected to the coil. The solenoid can be arranged to communicate vibration from rotational unbalance of the input member as excitation to the retainer and biasing member. The retainer can have a locked position and an unlocked position arranged along a retainer axis, the input member connected to the drive member when the retainer is in the locked position, the input member disconnecting from the drive member when the retainer is the unlocked position.

In accordance with certain embodiments, the disconnect coupling can include a plunger. The plunger can be arranged along a plunger axis with an engaged position and a disengaged position, the plunger axis intersecting the retainer axis and the rotation axis. In the engaged position the plunger can disconnect the input member from the drive member by displacing the input member relative to the drive member along the rotation axis. In the disengaged position the plunger can be spaced apart from the input member such that the input member is fixed in rotation relative to the drive member. A plunger biasing member arranged to bias the plunder along the plunger axis toward the disengaged position.

It is contemplated that the retainer can retain the plunger in the disengaged position when the retainer is in the locked position. The solenoid can be energized via the manual disconnect lead to displace the retainer from the locked position to the unlocked position, the plunger thereby moving from the disengaged position to the engaged position to manually disconnect the input member from the drive member. The solenoid can communicate vibrational excitation to the retainer and biasing member, the retainer and biasing member automatically disconnecting the input member from the drive member when rotating unbalance of the input member is below the predetermined level. The input member can have face teeth and a ramp. The face teeth and the ramp can be arranged on a common end or opposite ends of the drive member.

A generator arrangement includes an input member arranged along a rotation axis, a stator supporting the input member for rotation about the rotation axis, and an automatic disconnect coupling as described above. The retainer axis can be parallel to the rotation axis. In certain embodiments, a constant speed drive can be connected to the input member. The constant speed drive and input member are arranged within a common housing. The constant speed drive can be housed within an accessory gearbox.

A method of automatically disconnecting a generator input member from a drive member includes exciting a retainer with rotational unbalance of a generator input member. Connection between the input member and a drive member can be retained when the rotational unbalance at a fundamental frequency of a retainer is below a predetermined level. The input member can be disconnected from the drive member when rotational unbalance exceeds the predetermined level.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
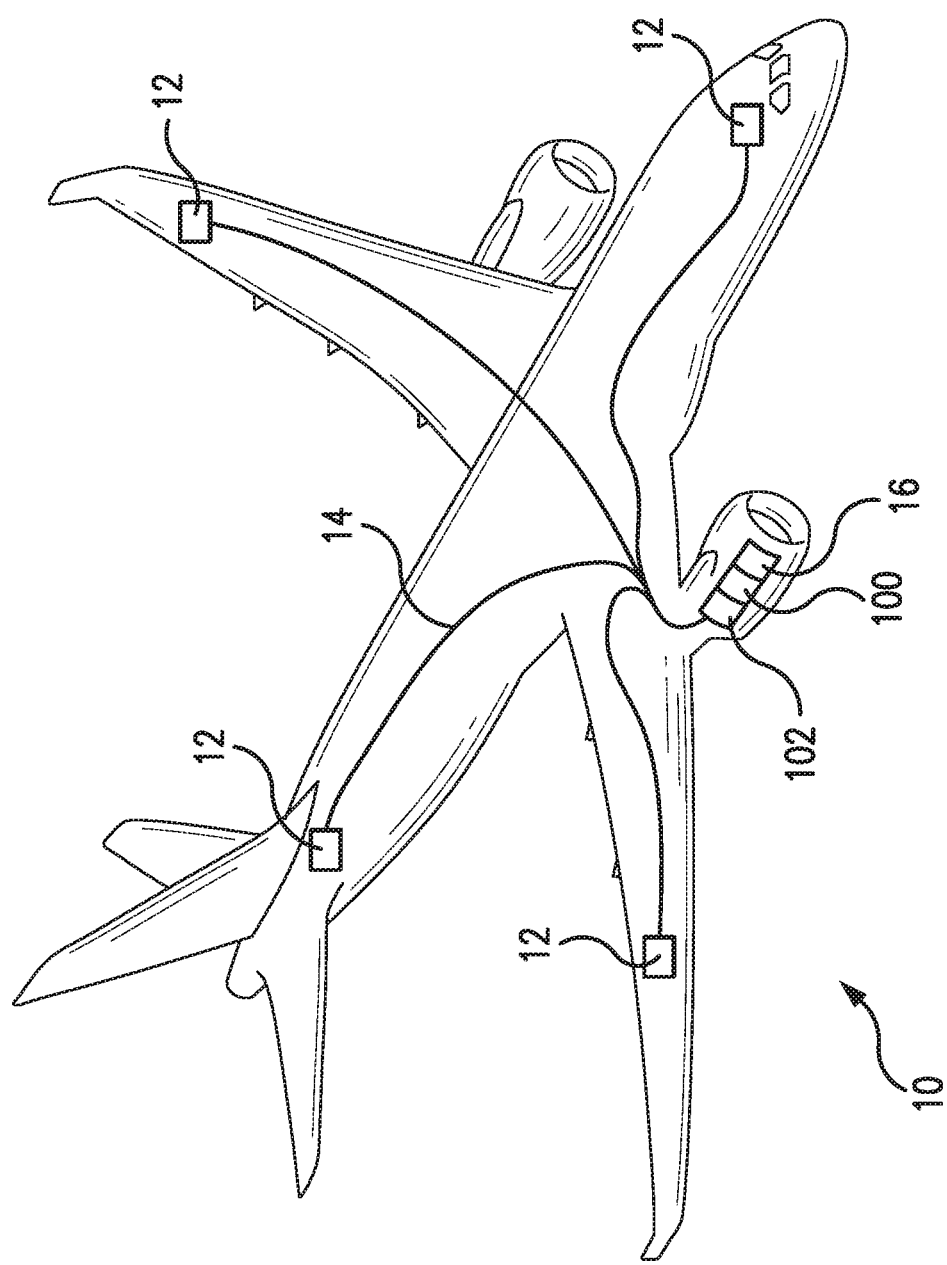
FIG. 1 is a schematic view of an exemplary embodiment of an aircraft electrical system constructed in accordance with the present disclosure, showing a generator connected to an engine by an automatic disconnect coupling.

Reference will now be made to the drawings wherein like reference numerals identify similar structural features or aspects of the subject disclosure. For purposes of explanation and illustration, and not limitation, a partial view of an exemplary embodiment of an automatic disconnect coupling in accordance with the disclosure is shown in FIG. 1 and is designated generally by reference character 100. Other embodiments of disconnect couplings, generators with disconnect couplings, and methods of automatically disconnecting generators from engines in accordance with the present disclosure, or aspects thereof, are provided in FIGS. 2-5, as will be described. The systems and methods described herein can be used in aircraft electrical systems to automatically disconnect generators from engines, though the present disclosure is not limited to aircraft electrical systems or generator disconnect couplings in general.

Referring to FIG. 1, an electrical system 10, e.g., an aircraft electrical system, is shown. Electrical system 10 includes a plurality of power-consuming devices 12 connected to a generator 102 by a power distribution bus 14. Generator 102 is operably connected to a rotation source, e.g., a gas turbine engine 16, by an automatic disconnect coupling 100. Although illustrated herein as an aircraft electrical system, it is to be understood and appreciated that the present disclosure can benefit other types of electrical systems.

Figure 2:
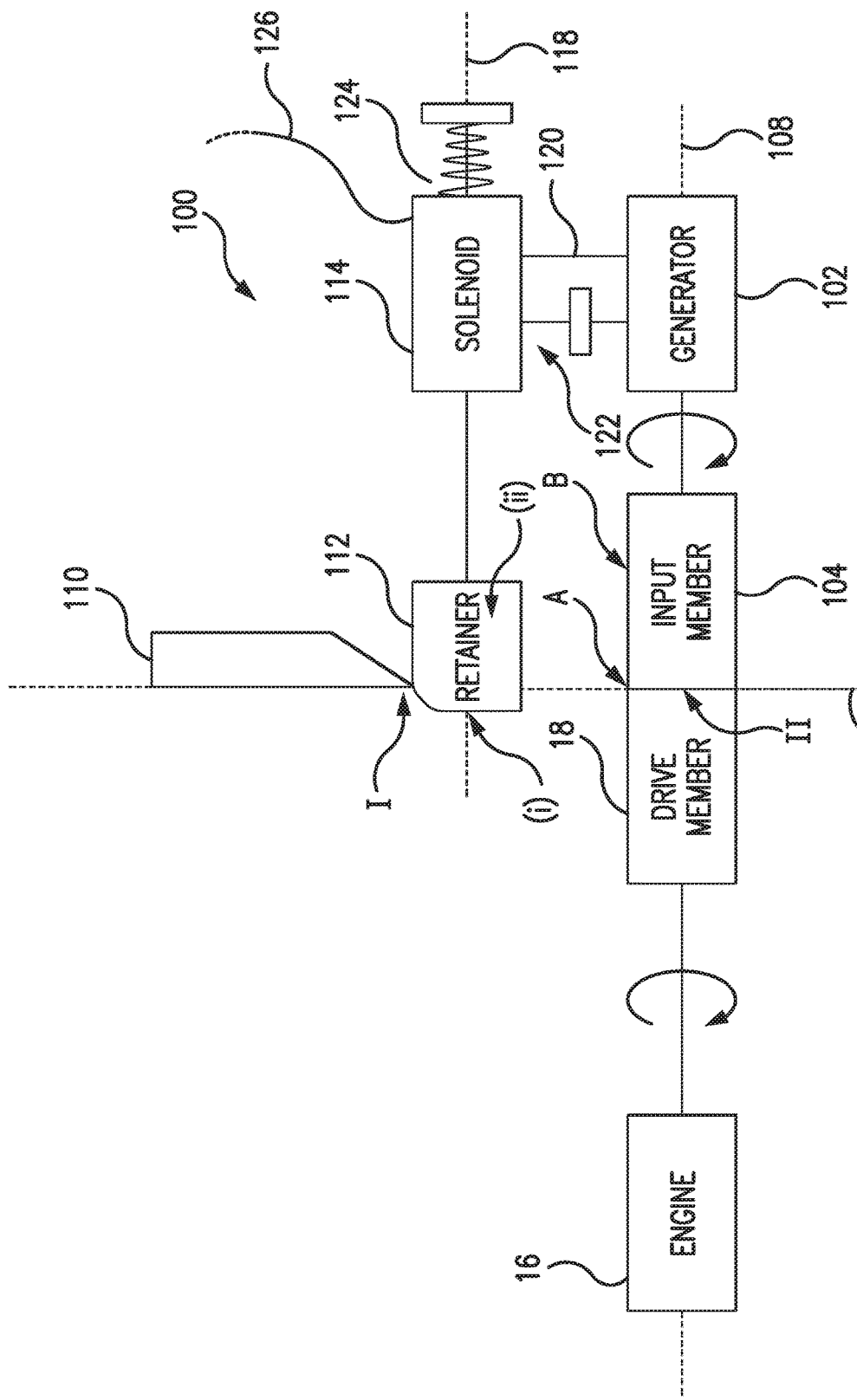
FIG. 2 is a block diagram of the engine and generator of FIG. 1, schematically showing the disconnect coupling connecting the generator to the engine.

With reference to FIG. 2, disconnect coupling 100 is shown connecting generator 102 to engine 16. Engine 16 includes (or is connected to) a drive member 18, which receives mechanical rotation from engine 16. Generator 102 has an input member 104, which is operably connected to a rotor 106 (shown in FIG. 4) of generator 102, and which has a connected position A and a disconnected position B. When in the connected position A, illustrated in FIG. 2, input member 104 is rotationally fixed relative to the drive member 18 such that input member 104 rotates with drive member 18 about a rotation axis 108. Connection between input member 104 and drive member 18 can be as described in U.S. Pat. No. 8,963,391 to Grosskopf et al., issued on Feb. 24, 2015, the contents of which are incorporated herein by reference in their entirety.

Disconnect coupling 100 includes a plunger 110, a retainer 112, and a solenoid 114. Plunger 110 is movable along a plunger axis 116 between a disengaged position I and an engaged position II. When in the disengaged position I, shown in FIG. 2, plunger 110 is spaced apart from input member 104. This allows input member 104 to remain in connected position A such input member 104 rotates with drive member 18.

Retainer 112 is movable along a retainer axis 118 between a locked position (i) and an unlocked position (ii). When in the locked position (i) shown in FIG. 2 retainer 112 retains plunger 110 in the disengaged position I, allowing input member 104 to remain connected to drive member 18 such that input member 104 continues to rotate with drive member 18.

Solenoid 114 is operably connected to retainer 112 for moving retainer 112 between the locked position (i) and the unlocked position (ii). Solenoid 114 is also connected to generator 102 through a damper 120 with a predetermined damping coefficient 122 and has a biasing member 124 and a manual disconnect lead 126. Biasing member 124 is arranged to urge retainer 112 toward the locked position (i). Manual disconnect lead 126 is connected to a user interface, such as switch disposed on the flight deck of an aircraft, and is arranged to provide a manual disconnect current to solenoid 114 which causes solenoid 114 to manually move retainer 112 from the locked position (i) to the unlocked position (ii).

Figure 3:
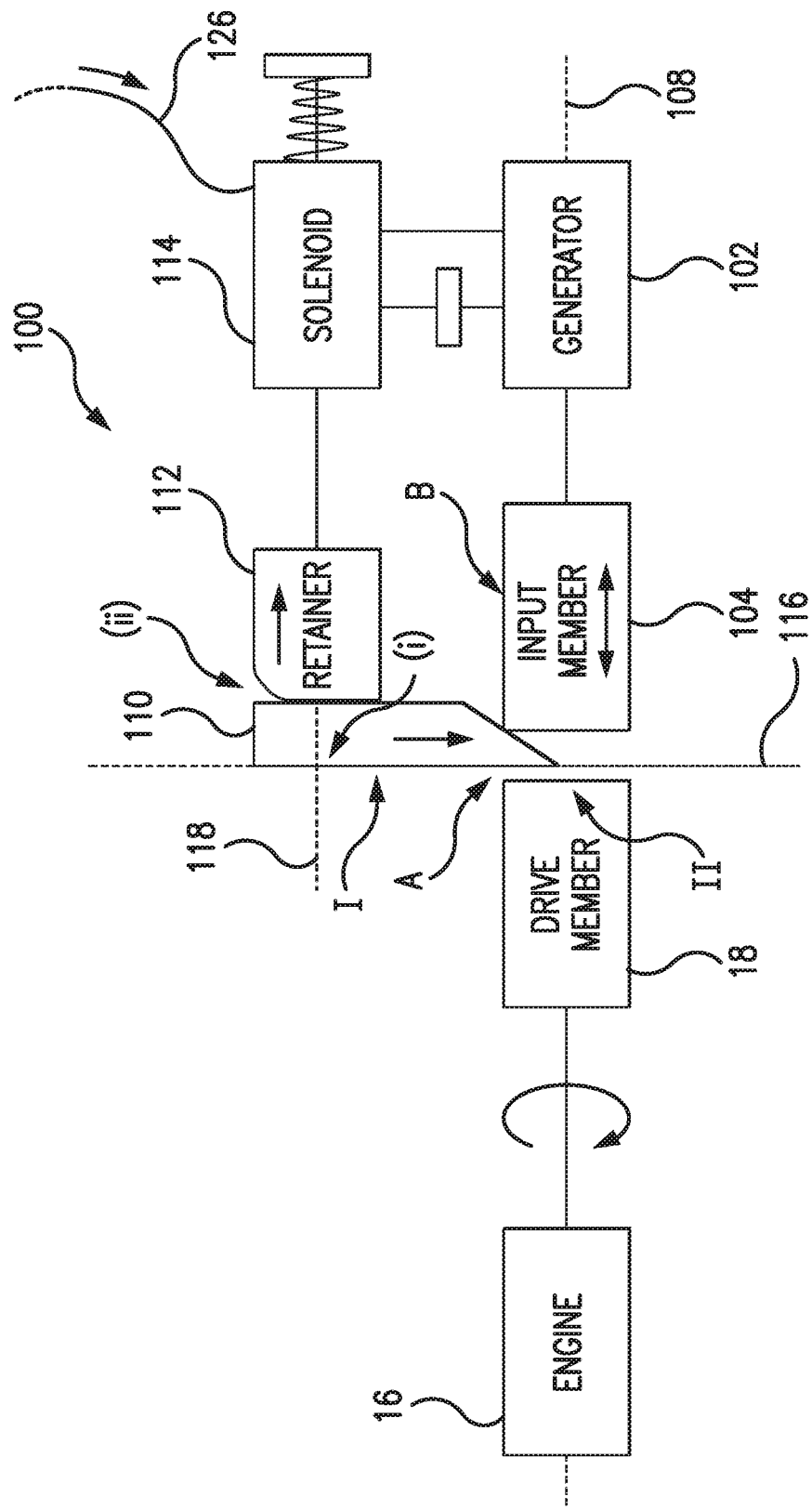
FIG. 3 is a block diagram of the engine and generator of FIG. 1, schematically showing the disconnect coupling separating the generator from the engine.

With reference to FIG. 3, generator 102 is shown disconnected from engine 16. Upon receipt of a manual disconnect command signal through disconnect lead 126, solenoid 114 moves retainer 112 from the locked position (i) to the unlocked position (ii). Movement from the locked position (i) to the unlocked position (ii) causes plunger 110 to move from the disengaged position I to the engaged position II such that an end of plunger 110 frictionally engages input member 104. Frictional engagement of plunger 110 with input member 104 drives input member 104 axially along rotation axis 108, separating input member 104 from drive member 18. Being separated from drive member 18, input member 104 is rotationally free from drive member 18 and ceases rotation such power generation by generator 102 ceases.

Figure 4:
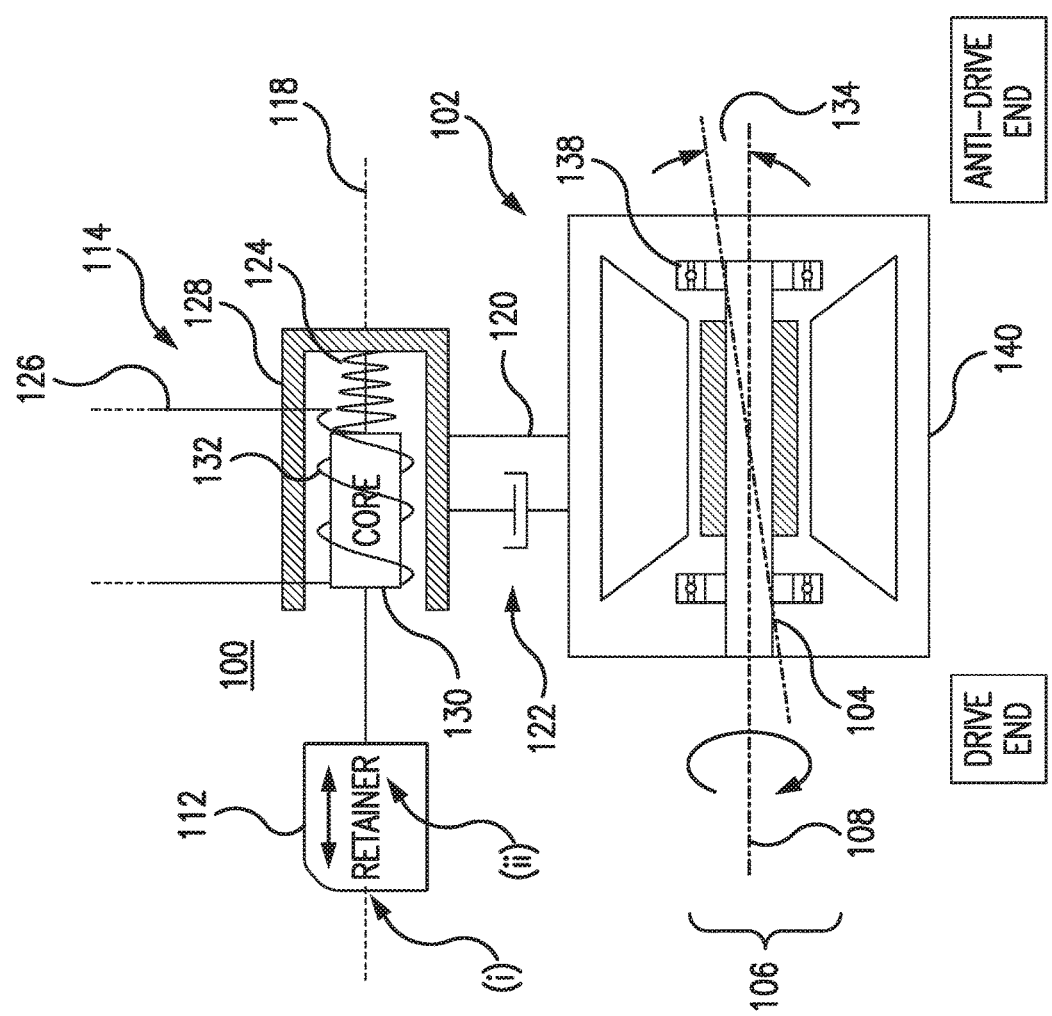
FIG. 4 is a block diagram of the disconnect coupling of FIG. 1, schematically showing a retainer and biasing member connected to the generator to automatically disconnect the generator from the engine using vibrational excitation received from the generator.

With reference to FIG. 4, disconnect coupling 100 and generator 102 are shown. Disconnect coupling 100 is operable by way of solenoid 114, which has a housing 128, a core 130, and a coil 132. Core 130 formed from a magnetic material, is arranged within solenoid housing 128, and is connected to retainer 112 such that retainer 112 and core 130 move in concert with one another along retainer axis 118 relative to housing 128. Biasing member 124 is arranged between housing 128 and retainer 112 toward locked position (i).

Coil 132 is fixed relative to housing 128 and wraps about retainer movement axis 118 and core 130. Coil 132 is also electrically connected to disconnect lead 126 such that, upon application of a disconnect current, coil 132 generates a magnetic field. The magnetic field couples with core 130 to drive core along retainer movement axis 118, retainer 112 moving with core 130 from locked position (i) to unlocked position (ii). This allows plunger 110 (shown in FIG. 2) to effect a generator disconnect as described above.

Biasing member 124 is arranged to exert a biasing force on retainer 112 that urges retainer toward locked position (i). The biasing force is such that, when current is removed from coil 132, retainer moves from the unlocked position (ii) to the locked position (i). This can occur in cooperation with a retrieval mechanism or similar device to return plunger 110 to the disengaged position I (shown in FIG. 2), such as when it is necessary to resume power generation by reconnecting input member 104 with drive member 18.

As will be appreciated by those of skill in the art, rotating machines typically has some amount rotating unbalance. Rotating unbalance is commonly determined by measuring misalignment between the center of mass of the rotating machine rotor and rotation axis, i.e. the geometric axis, of the rotating machine rotor. With respect to generator 102, a rotating unbalance 134 is shown in FIG. 4, illustrated in an exemplary manner by an angle defined between rotation axis 108 and generator rotation axis 136. Rotating unbalance 134 may be caused, by way of non-limiting example, by wear in a bearing assembly 138 supporting input member 104. Such rotating unbalance causes a moment during rotation, giving rotor 106 a wobbling movement during rotation, which is communicated to generator stator portion 140 as vibration.

Since vibration can cause noise, operator fatigue, and/or damage to the rotating machine, rotating unbalance is typically limited by balancing the rotating machine rotor and providing damping to stationary components to absorb residual rotating unbalance remaining once the rotor is balanced. In high speed rotating machinery, such as generators for aircraft electrical systems, balance is typically carefully controlled to limit vibration and the associated noise, fatigue, and/or damage that can occur from excessive amounts of vibration. However, as will also be appreciated by those of skill in the art in view of the present disclosure, rotating unbalance can increase in some types of generators over time, such as from wear in the bearing assemblies the support the generator rotor.

To prevent vibration above a predetermined level solenoid 114 is connected by damper 120 to generator 102. Damper 120 provides damping coefficient 122 to retainer 112 and biasing member 124, causing retainer 112 and biasing member 124 to behave as a spring-mass system tuned to have fundamental frequency corresponding to the rotational speed of input member 104 such that 1/rotation loads excite the spring mass system at the spring mass system fundamental frequency. For example, in an exemplary embodiment where input member 104 has a rotational speed of 6000 rotations per minute, the fundamental frequency of retainer 112 and biasing member 124 is at about 100 hertz. This tuning sensitizes retainer 112 and biasing member 124 to vibrational excitation received from input member 104 through damper 120, causing vibration of input member 104 from rotational unbalance to displace retainer 112 from locked position (i). It is contemplated that displacement of retainer 112 from locked position (i) occur without application of an actuation current to disconnect lead 126, thereby effecting automatic disconnection of generator 102 from engine 16 (shown in FIG. 1).

In certain embodiments, damping coefficient is tuned to a vibration excitation magnitude at the fundamental frequency which is characteristic of incipient bearing failure. For example, Applicant has determined that retainer 112 can have a sensitizing feature 142 to make relatively small amounts of increased rotational unbalance 134 displace retainer 112. In certain embodiments, sensitizing feature 142 is implemented by arranging disconnect coupling 100 with an off-the-shelf solenoid on an anti-drive end of generator 102 using damper 120 and damping coefficient 122.

Figure 5:
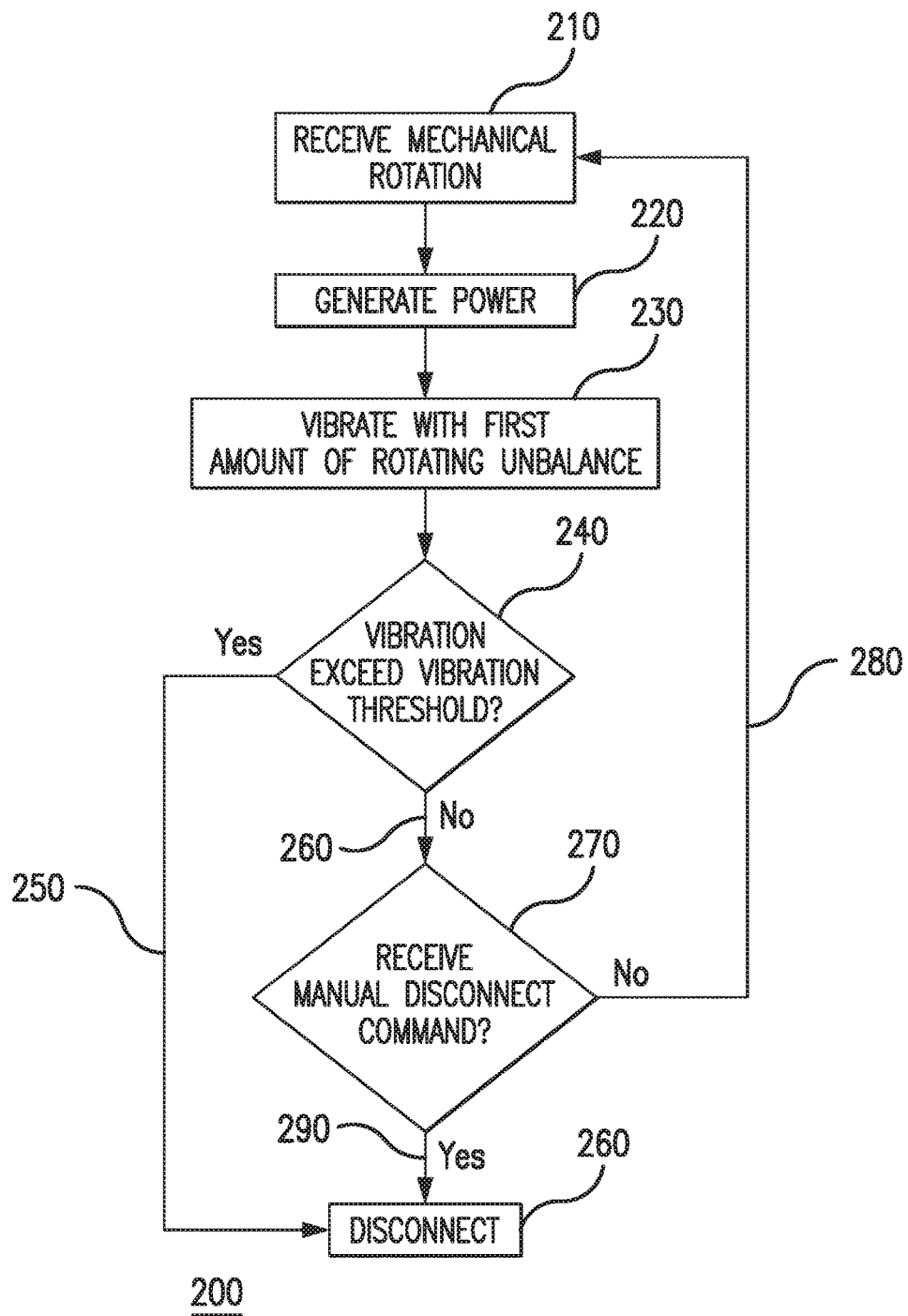
FIG. 5 is a block diagram of a method of disconnecting a generator from an engine, showing steps for manually disconnecting a generator from an engine using based on a disconnect command and automatically disconnecting the generator from the engine based on generator vibration.

With reference to FIG. 5, a method 200 of automatically disconnecting a generator, e.g., generator 102 (shown in FIG. 1), is shown. Method 200 includes receiving mechanical rotation from at input member, e.g., input member 104 (shown in FIG. 2), from a source of mechanical rotation, e.g., engine 16 (shown in FIG. 1), as shown with box 210. The generator rotates using the mechanical rotation, thereby generating electrical power, as shown with box 220. During rotation the generator vibrates according to a first amount of rotational unbalance, e.g., rotational unbalance 134 (shown in FIG. 4), as shown with box 230. The vibration is communicated to a solenoid, e.g., solenoid 114 (shown in FIG. 1), connected to the generator through a damper with a damping coefficient, e.g., damper 120 and damping coefficient 122 (shown in FIG. 2), and compared to a predetermined vibration level as shown with decision box 240. If the communicated vibration exceeds the predetermined threshold the solenoid automatically disconnects the generator from the source of mechanical rotation, as shown with arrow 250. If the vibration communicated by the generator does not exceed the predetermined threshold then no automatic disconnect occurs, as shown with arrow 260.

As also shown in FIG. 5, the disconnect coupling can disconnect the generator from the rotation source upon receipt of a manual disconnect command, such as when a disconnect current is received through disconnect lead 126, as shown with box 270. Upon receipt of a manual disconnect command the disconnect coupling disconnects the generator from the engine, as shown with arrow 290. Absent vibration exceeding the predetermined threshold or receipt of a manual disconnect command, the generator remains connected to the engine and receives mechanical rotation therefrom, as shown with arrow 280.

Rotating machinery typically has some amount uneven distribution of mass around an axis of rotation, which is typically referred to as rotating unbalance. Balance in rotating machinery is commonly determined by measuring misalignment between the center of mass of the rotating machine rotor and rotation axis, i.e. the geometric axis, of the rotating machine rotor. The rotating unbalance causes a moment during rotation, giving the rotor a wobbling movement during rotation, which is typically communicated to the stator portion of the rotating machine as vibration. Since vibration can cause noise, operator fatigue, and/or damage to the rotating machine, rotating unbalance is typically limited by balancing the rotating machine rotor and providing damping to stationary components to absorb residual rotating unbalance remaining once the rotor is balanced. In high speed rotating machinery, such as generators for aircraft electrical systems, balance is typically carefully controlled to limit vibration and the associated noise, fatigue, and/or damage that can occur from excessive amounts of vibration.

One challenge to rotating unbalance is that rotor balance can change during service, for example from bearing wear. If undetected, increased rotating unbalance can exert increased rotating loadings to the static portions of the rotating machine, increasing the magnitude of vibration and noise associated with operation of the rotating machine. If undetected, prolonged operation of the rotating machine with increased rotating unbalance can damage the rotating machine and/or the surrounding structure, reducing availability.

In embodiments described herein an automatic disconnect coupling is provided which automatically disconnects the rotor of a rotating machine when rotating unbalance exceeds a predetermined level, ceasing application of loads associated with the rotating unbalance on the surrounding structure. In certain embodiments, a spring mass of a coupling retainer is in mechanical communication with the rotating machine rotor to receive excitation therefrom. The spring mass has a fundamental frequency tuned to the rotational speed of the rotating machine rotor such that, when the one per revolution of the excitation of the rotating unbalance exceeds a predetermined value, the spring mass causes a coupling retainer to unlock the coupling, disconnecting the rotor from the source of mechanical rotation. This automatically disconnects the rotor, eliminating the rotating loads that would otherwise be exerted on the surrounding static structure. In accordance with certain embodiments, generators employing such automatic disconnect couplings can be less massive that otherwise required as generator static structure is protected from high static loadings by the automatic disconnect feature of the coupling.

The methods and systems of the present disclosure, as described above and shown in the drawings, provide for disconnect couplings and generator arrangements with superior properties, including reduced collateral damage to generator and gearbox static structures like housing from generator bearing failures which could otherwise cause in-flight engine shutdowns. While the apparatus and methods of the subject disclosure have been shown and described with reference to preferred embodiments, those skilled in the art will readily appreciate that change and/or modifications may be made thereto without departing from the scope of the subject disclosure.

What is claimed is:

1. An automatic disconnect coupling, comprising:
    a retainer; and
    a biasing member coupled to the retainer and arranged to communicate excitation from a generator input member to the retainer,
    wherein the retainer and biasing member have a fundamental frequency tuned to rotational speed of the generator input member to automatically disconnect the input member from a drive member when rotating unbalance of the input member exceeds a predetermined level.

2. The coupling as recited in claim 1, further comprising a solenoid with a core and a coil operatively connected to the retainer, wherein the retainer is fixed relative to the solenoid core.

3. The coupling as recited in claim 2, wherein the solenoid is arranged to communicate vibration of the input member to the retainer and the biasing member.

4. The coupling as recited cited in claim 2, further comprising a manual disconnect lead connected to the solenoid coil.

5. The coupling as recited in claim 2, wherein the retainer is movable between a locked position and an unlocked position defined along a retainer axis, the retainer retaining connection of the input member to the drive member in the locked position, the input member disconnecting from the drive member when the retainer moves from the locked position.

6. The coupling as recited in claim 1, further comprising a plunger angled relative to the retainer and having engaged and disengaged positions, wherein the biasing member biases the retainer toward the plunger to lock the plunger in the disengaged position.

7. The coupling as recited in claim 6, wherein the retainer is arranged to lock the plunger in the disengaged position when the rotating unbalance of the input member is below the predetermined level.

8. The coupling as recited in claim 6, wherein the retainer is arranged to allow movement of the plunger to the engaged position when the rotating unbalance of the input member is above the predetermined level.

9. The coupling as recited in claim 1, further comprising a plunger biasing member urging a plunger toward the engaged position.

10. The coupling as recited in claim 1, wherein the input member includes face teeth and a ramp, wherein the face teeth and ramp are disposed on a common end of the input member.

11. The coupling as recited in claim 1, wherein the input member includes face teeth and a ramp, wherein the face teeth and ramp are disposed on opposite ends of the input member.

12. A generator arrangement, comprising:
    an input member arranged along a rotation axis;
    a stator supporting the input member for rotation about the rotation axis; and
    an automatic disconnect coupling, comprising:
        a retainer; and
        a biasing member coupled to the retainer and arranged to communicate excitation from the input member to the retainer,
        wherein the retainer and biasing member have a fundamental frequency tuned to rotational speed of the input member to automatically disconnect the input member from a drive member when rotating unbalance of the input member exceeds a predetermined level, wherein the retainer is connected between the stator and the input member, a core being movable along a retainer axis parallel to the rotation axis.

13. The generator arrangement as recited in claim 12, further comprising a constant speed drive operably connected to the input member.

14. The generator arrangement as recited in claim 13, wherein the constant speed drive and the input member are arranged within a common housing.

15. The generator arrangement as recited in claim 13, wherein the constant speed drive is housed within an accessory gearbox.

16. A method of automatically disconnecting a generator input member from a drive member, comprising:
    exciting a retainer with rotational unbalance of a generator input member;
    retaining connection of the input member with a drive member when the rotational unbalance at a fundamental frequency of the retainer is below a predetermined level; and
    disconnecting the input member from the drive member when the rotational unbalance exceeds the predetermined level.

17. The method as recited in claim 16, further comprising re-connecting the input member to the drive member, and manually disconnecting the input member from the drive member.

* * * * *